United States Patent [19]

Huybrechts

[11] Patent Number: 4,918,180

[45] Date of Patent: Apr. 17, 1990

[54] PREPARATION OF CELLULOSE ETHERS

[75] Inventor: Serge Huybrechts, Perthshire, Great Britain

[73] Assignee: Union Carbide Chemicals and Plastics Company, Inc., Danbury, Conn.

[21] Appl. No.: 277,812

[22] PCT Filed: Sep. 24, 1987

[86] PCT No.: PCT/GB87/00673

§ 371 Date: Nov. 23, 1988

§ 102(e) Date: Nov. 23, 1988

[87] PCT Pub. No.: WO88/02375

PCT Pub. Date: Apr. 7, 1988

[30] Foreign Application Priority Data

Sep. 24, 1986 [GB] United Kingdom .............. 8622952

[51] Int. Cl.⁴ .................. C08B 37/00; C08B 3/06; C08B 11/193; C08B 11/08

[52] U.S. Cl. ...................... 536/56; 536/61; 536/80; 536/91; 536/126

[58] Field of Search ............. 536/56, 61, 80, 91, 536/126

[56] References Cited

U.S. PATENT DOCUMENTS 2,839,526 6/1958 Miller ............................ 536/86

FOREIGN PATENT DOCUMENTS 0853378 11/1960 United Kingdom .

Primary Examiner—John Kight, III
Assistant Examiner—C. Azpuru
Attorney, Agent, or Firm—Henry H. Gibson

[57] ABSTRACT

A process for reducing the dust content of cellulose ethers comprises reacting the cellulose ether with an aggregating agent comprising (1) a polypropylene glycol or a propoxylated alcohol and (2) an ethylene oxide/propylene oxide copolymer.

6 Claims, No Drawings

PREPARATION OF CELLULOSE ETHERS

The present invention relates to an improved method of preparing cellulose ethers. In particular, the present invention relates to a method of producing cellulose ethers having a reduced dust content relative to prior art products.

The manufacture of cellulose ethers from natural sources of cellulose (known in the art as cellulose furnishes) are known industrial processes. In such processes the cellulose furnish is first contacted with alkali to produce alkali cellulose and then contacted with an etherifying agent to convert the alkali cellulose into the cellulose ether. The crude cellulose ether product is then washed, separated from the washing and finally dried to form a solid product.

A disadvantage of these processes is that the solid product tends to have a wide particle size distribution. In particular such solid products tend to contain large amounts of dust (<45 μm particles) which are difficult to handle and hence of limited commercial value.

An improvement has now been developed which produces cellulose ethers having a reduced dust content relative to those processes employed previously. The improvement is achieved by treating the cellulose ether with a novel aggregating agent.

Accordingly the present invention provides a process for preparing a modified cellulose ether which comprises reacting a cellulose ether with an effective amount of an aggregating agent comprising (1) a polypropylene glycol or a propoxylated alcohol and (2) an ethylene oxide/propylene oxide copolymer.

The first component of the aggregating agent is a polypropylene glycol, a propoxylated alcohol or mixture thereof. Preferably the first component is a molecule having the formula $$RO(CH_2CH(CH_3)O)_nH$$

wherein R is selected from hydrogen or a $C_1$ to $C_{30}$ alkyl group and n is an integer from 1 to 30.

The second component, which is an ethylene oxide/propylene oxide copolymer, is suitably a polyfunctional alcohol, amine or the like which has been alkoxylated with ethylene oxide and propylene oxide. The alkoxylation can be carried out to produce either a random or a block ethylene oxide/propylene oxide copolymer. Examples of such materials include alkylene oxide adducts of ethylene glycol, propylene glycol, glycerol, the isomeric butanediols, hexanediols, octanediols, pentaerythritol, sorbitol, arabitol, mannitol, alkyl glucoside, alkylene glycol glucosides and glycerol glucosides. Adducts of alkylene diamines and hydrazine can also be used. The hydroxyl number of the ethylene oxide/propylene oxide copolymer is preferably in the range 25 to 180.

As regards the ratio of the two components (component 1:component 2) this suitably lies in the weight ratio range 10:1 to 1:10 preferably 3:1 to 1:3. The weight ratio of cellulose ether to aggregating agent preferably lies in the range 100,000:1 to 100:1.

Although the process described above is applicable to the production of any cellulose ether, it is particularly applicable where the cellulose ether is a $C_2$-$C_4$ hydroxyalkyl cellulose (e.g. HEC), carboxymethyl cellulose, methyl cellulose or ethyl hydroxyethyl cellulose.

Although treatment with the aggregating agent can take place at any time, it is preferable that aggregation is carried out during the manufacture of the cellulose ether, e.g. immediately after washing and centrifuging the crude product of the etherification process. In such a case it is convenient to mix the wet centrifuge cake and the aggregating agent and thereafter dry the cake in the usual way.

The invention is now illustrated by the following Examples.

EXPERIMENTAL PROCEDURE

To the wet centrifuge cake of the chosen grade of hydroxyethyl cellulose (HEC) was added an appropriate amount of the aggregating agent comprising a mixture of the two specified components. The weights of each component are expressed in the table as a percentage of the wet cake used. The centrifuge cake and the aggregating agent were mixed together and then the cake was dried to produce a final product for testing. The dust content of the final product was measured by studying the % retained when passed through sieves of various mesh size in the range 850μ to 15 μ.

TEST A AND EXAMPLES 1–8

In these experiments a Cellobond HEC 5000 (Cellobond is a Registered Trade Mark) was used as the HEC. The aggregating agent comprised (1) Breox FCA 500 (a polypropoxylated oleyl alcohol)—Breox is a Registered Trade Mark—of formula $RO(CH_2CH(CH_3)O)_nH$, $R=C_{18}$, $n=22$ and (2) an EO/PO copolymer polyol produced by propoxylating glycerol to a hydroxyl number equal to 465 mg/Kg and then further ethoxylating to a hydroxyl number of 56 mg/Kg. The compositions and results of the sieve tests are shown in Table 1.

TEST B AND EXAMPLES 9–15

In these experiments Cellobond HEC 400 was used. The aggregating agent comprised (1) either Breox FCA 500 and a polypropylene glycol of the type defined or the polypropylene glycol alone and (2) a polyol produced by propoxylating glycerol to a hydroxyl number equal to 465 mg/kg and then further ethoxylating to a hydroxyl number of 40 mg/kg (S284). The compositions and results of the sieve tests are shown in Table 2.

TEST C AND EXAMPLES 16–24

In these experiments Cellobond HEC 15A was used as the HEC. The aggregating agent comprised (1) polypropylene glycol 2025 and (2) polyol S284. The compositions and results of the sieve tests are shown in Table 3.

Comparison of the 45 um sieve tests in each Table show that a reduction of material of particle size <45 μm occurs when the cellulose ether is treated with the aggregating agent.

TESTS D, E AND F AND EXAMPLES 25–27

In these experiments three other cellulose ethers were used. These were respectively: carboxymethyl cellulose (Blanox SB—Blanox is a Registered Trade Mark); methyl cellulose (Methocel A4M—Methocel is a Registered Trade Mark) and ethyl hydroxyethylcellulose (Bermocoll FQ431—Bermocoll is a Registered Trade Mark). All three of Examples 25–27 showed a reduced <45 μm particle content relative to the equivalent Comparative Test.

In the above Examples and Comparative Tests:

PPG 2025 is a polypropylene glycol having a molecular weight of 2000.

Polyol S284 is a glycerine started ethylene oxide/propylene oxide having the formula RO(C$_2$H$_4$O)$_x$(C$_3$H$_8$O)$_y$H where R=glycerine x=85.5 and y=6.5. The molecular weight of Polyol S284=4200.

TABLE 1
EXPERIMENTS ON CELLOBOND HEC 5,000A

| EXAMPLE/ COMPARATIVE TEST | % BY WEIGHT FCA 500 | % BY WEIGHT POLYOL | % PASSING THROUGH MESH OF SIZE (μm) | | | | | |
|---|---|---|---|---|---|---|---|---|
| | | | 850 | 450 | 175 | 125 | 75 | 45 |
| TEST A | — | — | 93.6 | 90.8 | 83.8 | — | 50.4 | 14.5 |
| 1 | 0.03 | 0.15 | 97.3 | 94.4 | 80.0 | — | 41.3 | 12.4 |
| 2 | 0.03 | 0.40 | 94.8 | 88.8 | 71.8 | — | 34.2 | 10.7 |
| 3 | 0.03 | 0.50 | 94.4 | 86.7 | 67.1 | — | 28.0 | 8.6 |
| 4 | 0.03 | 0.60 | 86.1 | 76.9 | 56.0 | — | 23.7 | 6.5 |
| 5 | 0.03 | 1.00 | 81.5 | 73.0 | 62.5 | 48.3 | 26.0 | 6.8 |
| 6 | 0.03 | 2.00 | 86.0 | 78.0 | 62.1 | 43.0 | 19.1 | 3.3 |
| 7 | 0.05 | 0.15 | 96.9 | 93.8 | 81.6 | 61.6 | 31.8 | 3.4 |
| 8 | 0.05 | 0.30 | 95.3 | 90.0 | 67.5 | 45.1 | 20.6 | 1.1 |

TABLE 2
EXPERIMENTS ON CELLOBOND HEC 400A

| EXAMPLE/ COMPARATIVE TEST | % BY WEIGHT FCA 500 | POLYPROPYLENE GLYCOL TYPE | % BY WEIGHT POLYPROPYLENE GLYCOL | % BY WEIGHT POLYOL | % PASSING THROUGH MESH OF SIZE (μm) | | | | | |
|---|---|---|---|---|---|---|---|---|---|---|
| | | | | | 850 | 450 | 175 | 125 | 75 | 45 |
| TEST B | — | — | — | — | 98.2 | 95.9 | 89.0 | 75.4 | 46.8 | 14.9 |
| 9 | 0.02 | 425 | 0.2 | 0.2 | 97.9 | 94.3 | 80.8 | 63.9 | 37.5 | 14.9 |
| 10 | 0.02 | 1025 | 0.2 | 0.2 | 98.0 | 95.0 | 87.2 | 74.4 | 40.5 | 1.8 |
| 11 | 0.02 | 2025 | 0.2 | 0.2 | 97.8 | 96.1 | 86.9 | 67.3 | 30.9 | 0.6 |
| 12 | — | 2025 | 0.2 | 0.2 | 98.2 | 95.2 | 86.6 | 68.4 | 29.2 | 0.7 |
| 13 | — | 3025 | 0.2 | 0.2 | 68.2 | 52.3 | 35.6 | 21.9 | 7.1 | 0 |
| 14 | — | 3025 | 0.1 | 0.2 | 97.4 | 93.7 | 83.7 | 66.1 | 34.8 | 3.2 |
| 15 | — | 4025 | 0.1 | 0.2 | 93.4 | 89.7 | 79.6 | 61.1 | 28.0 | 1.9 |

TABLE 3
EXPERIMENTS ON CELLOBOND HEC 15A

| EXAMPLE/ COMPARATIVE TEST | % BY WEIGHT PPG 2025 | % BY WEIGHT POLYOL S 284 | % PASSING THROUGH MESH OF SIZE (μm) | | | | | |
|---|---|---|---|---|---|---|---|---|
| | | | 850 | 450 | 175 | 125 | 75 | 45 |
| TEST C | — | — | 99.6 | 96.9 | 88.0 | 75.0 | 52.7 | 20.3 |
| 16 | 0.05 | 0.10 | 99.7 | 98.7 | 90.1 | 75.0 | 47.2 | 11.4 |
| 17 | 0.10 | 0.20 | 99.7 | 98.7 | 90.0 | 72.6 | 45.4 | 11.4 |
| 18 | 0.15 | 0.30 | 99.6 | 97.9 | 84.7 | 62.9 | 36.6 | 10.2 |
| 19 | 0.20 | 0 | 99.9 | 99.8 | 93.6 | 83.7 | 61.5 | 6.2 |
| 20 | 0.20 | 0.20 | 99.5 | 97.4 | 88.5 | 74.5 | 42.5 | 1.9 |
| 21 | 0.20 | 0.40 | 99.3 | 96.4 | 87.7 | 75.6 | 40.6 | 0.5 |
| 22 | 0.10 | 0.40 | 100.0 | 99.1 | 90.9 | 74.3 | 43.8 | 2.8 |
| 23 | 0.15 | 0.40 | 99.6 | 98.0 | 90.1 | 77.1 | 47.2 | 1.3 |
| 24 | 0.30 | 0.30 | 99.6 | 97.7 | 90.8 | 79.5 | 42.5 | 1.2 |

TABLE 4
EXPERIMENTS USING CELLULOSE ETHERS

| EXAMPLE/ COMPARATIVE TEST | CELLULOSE ETHER | % BY WEIGHT PPG 2025 | % BY WEIGHT POLYOL S284 | % PASSING THROUGH MESH OF SIZE (μm) | | | | | |
|---|---|---|---|---|---|---|---|---|---|
| | | | | 850 | 450 | 175 | 125 | 75 | 45 |
| TEST D | Carboxymethyl cellulose | — | — | 100 | 99.6 | 99.3 | 92.9 | 77.0 | 46.7 |
| 25 | Carboxymethyl cellulose | 0.3 | 0.3 | 99.9 | 99.8 | 89.8 | 50.2 | 17.6 | 1.24 |
| TEST E | Methylcellulose | — | — | 100 | 98.4 | 88.5 | 81.9 | 53.9 | 14.6 |
| 26 | Methylcellulose | 0.3 | 0.3 | 52.6 | 24.5 | 4.5 | 1.5 | 1.2 | 0.3 |
| TEST F | Ethylhydroxyethyl cellulose | — | — | 99.7 | 99.2 | 85.3 | 50.5 | 36.2 | 15.8 |
| 27 | Ethylhydroxyethyl cellulose | 0.3 | 0.3 | 99.4 | 97.6 | 52.3 | 19.7 | 3.9 | 1.5 |

I claim:

1. A process for preparing a modified cellulose which comprises reacting a cellulose ether with an effective amount of an aggregating agent in order to reduce the dust content of the cellulose ether, said aggregating agent comprising (1) a polypropylene glycol or a propoxylated alcohol and (2) ethylene oxide/propylene oxide copolymer.

2. A process as claimed in claim 1 wherein component (1) is a molecule having the formula:

$$RO(CH_2CH(CH_3)O)_nH$$

where R is selected from hydrogen or a $C_1$ to $C_{30}$ alkyl group and n is an integer from 1 to 30.

3. A process as claimed in claim 2 wherein the ethylene oxide/propylene oxide copolymer has a hydroxyl number in the range 25 to 180.

4. A process as claimed in claim 1 wherein the weight ratio of component 1:component 2 is in the ratio 3:1 to 1:3.

5. A process as claimed in claim 1 wherein the weight ratio of cellulose ether to aggregating agent is in the range 100,000:1 to 100:1.

6. A process as claimed in claim 1 wherein the cellulose ether is selected from the group consisting of a $C_2$–$C_4$ hydroxyalkyl cellulose, carboxymethyl cellulose, methyl cellulose and ethyl hydroxyethyl cellulose.

* * * * *